US012176614B2

(12) United States Patent
Lyu et al.

(10) Patent No.: US 12,176,614 B2
(45) Date of Patent: Dec. 24, 2024

(54) ANTENNA

(71) Applicant: WUHAN FINGU ELECTRONIC TECHNOLOGY CO., LTD., Hubei (CN)

(72) Inventors: Pengfei Lyu, Hubei (CN); Mingxing Liu, Hubei (CN); Hui Zhu, Hubei (CN)

(73) Assignee: WUHAN FINGU ELECTRONIC TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 17/975,640

(22) Filed: Oct. 28, 2022

(65) Prior Publication Data

US 2024/0145933 A1 May 2, 2024

(51) Int. Cl.

| | |
|---|---|
| ***H01Q 21/08*** | (2006.01) |
| ***H01Q 15/14*** | (2006.01) |
| ***H01Q 15/24*** | (2006.01) |
| ***H01Q 21/00*** | (2006.01) |

(52) U.S. Cl.

CPC ........... *H01Q 15/141* (2013.01); *H01Q 15/24* (2013.01); *H01Q 21/0087* (2013.01); *H01Q 21/08* (2013.01)

(58) Field of Classification Search

CPC .. H01Q 9/0414; H01Q 21/065; H01Q 15/141; H01Q 15/24; H01Q 21/0006; H01Q 21/0087; H01Q 21/08

See application file for complete search history.

(56) References Cited

FOREIGN PATENT DOCUMENTS

| | | | | | |
|---|---|---|---|---|---|
| CN | 111063996 A | * | 4/2020 | | H01Q 1/38 |
| CN | 113013587 A | | 6/2021 | | |
| CN | 113258272 A | * | 8/2021 | | H01Q 1/246 |
| CN | 215008558 U | * | 12/2021 | | |
| CN | 114447579 A | * | 5/2022 | | |
| WO | 2021237418 A1 | | 12/2021 | | |
| WO | WO-2022242282 A1 | * | 11/2022 | | H01Q 1/12 |
| WO | WO-2023025100 A1 | * | 3/2023 | | |
| WO | WO-2023030342 A1 | * | 3/2023 | | |

OTHER PUBLICATIONS

Search report of corresponding EP application No. 22204430.7.

* cited by examiner

*Primary Examiner* — Dameon E Levi
*Assistant Examiner* — Leah Rosenberg
(74) *Attorney, Agent, or Firm* — Samson G. Yu

(57) ABSTRACT

The present disclosure provides an antenna. The antenna includes: a main body structure having a first surface, wherein the main body structure is formed by placing a reflective metal plate in a mold and performing injection molding, and the main body structure is of an integrally formed structure; a radiation layer, wherein the radiation layer is electroplated on the first surface; and a power distribution layer, wherein the power distribution layer is electroplated on the first surface, the power distribution layer is electrically connected to the radiation layer, and the power distribution layer feeds the radiation layer.

13 Claims, 4 Drawing Sheets

ANTENNA

TECHNICAL FIELD

The present disclosure relates to the field of antennas, and particularly relates to an antenna.

BACKGROUND

In the related art, in a case of an antenna is manufactured, firstly, a radiation sheet needs to be etched on a PCB, then a plastic supporting structure is additionally installed on the PCB, then a guide sheet is installed on the plastic supporting structure, a filtering structure needs to be manufactured independently, and finally the PCB, the plastic supporting structure, the guide sheet and the filtering structure are assembled together to form the antenna. The cost of the PCB is relatively high, the overall antenna structure is complex, and the assembly of the antenna requires a large amount of working hours.

SUMMARY

The main purpose of the present disclosure is to provide an antenna.

In order to achieve the above purpose, according to one aspect of the present disclosure, an antenna is provided, including: a main body structure having a first surface, and the main body structure is made of plastic, and the main body structure is of an integrally formed structure; a radiation layer, and the radiation layer is electroplated on the first surface; and a power distribution layer, and the power distribution layer is electroplated on the first surface, the power distribution layer is electrically connected to the radiation layer, and the power distribution layer feeds the radiation layer.

Optionally, the main body structure includes a support member, the support member is located on the first surface, the antenna further includes a guide sheet, the guide sheet is located on the support member, and the guide sheet and the radiation layer are oppositely arranged at intervals.

Optionally, the distance between the guide sheet and the radiation layer is determined by the material of the guide sheet, the size of the guide sheet, the material of the radiation layer and the size of the radiation layer.

Optionally, the area of the guide sheet is greater than the area of the radiation layer.

Optionally, the guide sheet is in the shape of a rectangle.

Optionally, a plurality of guide sheets are provided, and the plurality of guide sheets are arranged at intervals at the same height.

Optionally, the main body structure includes a protruding structure, a first hole is formed in the center of the protruding structure in a penetration mode, a metal column is buried in the first hole, an electrical signal is input from the metal column, a first end of the power distribution layer is electrically connected to the metal column, and a second end of the power distribution layer is electrically connected to the radiation layer.

Optionally, two protruding structures are provided, which are respectively a first protruding structure and a second protruding structure, two metal columns are provided, which are respectively a first metal column and a second metal column, the power distribution layer includes a first power distribution line and a second power distribution line, the first end of the first power distribution line is electrically connected to the first metal column, the second end of the first power distribution line is electrically connected to the power distribution layer, so as to realize a positive 45-degree radiation feed structure, the first end of the second power distribution line is electrically connected to the second metal column, and the second end of the second power distribution line is electrically connected to the power distribution layer, so as to realize a negative 45-degree radiation feed structure.

Optionally, the radiation layer is in the shape of a square with two chamfers, the two chamfers are adjacent to each other, the second end of the first power distribution line is electrically connected to a first right angle of the square, so as to realize positive 45-degree radiation, and the second end of the second power distribution line is electrically connected to a second right angle of the square, so as to realize negative 45-degree radiation.

Optionally, the main body structure includes a filter cavity, and the filter cavity is located on the side of the reflective metal plate that is away from the first surface.

Optionally, the antenna further includes a filtering structure, and the filtering structure is located on the filter cavity.

Optionally, a plurality of grooves are formed in the filter cavity, the filtering structure includes a cover plate, a plurality of resonators and a plurality of tuning screws, a plurality of second holes are formed in the cover plate, and the filtering structure is installed on the filter cavity by means of the resonators.

According to the other aspect of the present disclosure, a method for manufacturing an antenna is provided, including: a reflective metal plate is prepared; the reflective metal plate in a mold is placed, and injection molding is performed to form a main body structure; and a radiation layer and a power distribution layer are electroplated on a first surface of the main body structure, and the power distribution layer is electrically connected to the radiation layer, and the power distribution layer feeds the radiation layer.

Optionally, the method further includes: a filtering structure is made, and the filtering structure comprises a cover plate, a plurality of resonators and a plurality of tuning screws; and a plurality of second holes are formed in the cover plate, and the tuning screws is mounted in the second holes, and portions of the tuning screws, which protrude from the second holes, extend into holes in the bottoms of the resonators.

Optionally, the main body structure is provided with a filter cavity, a plurality of grooves are formed in the filter cavity, and the method further includes: protrusion portions of the resonators are embedded into the grooves of the filter cavity.

Optionally, the method further includes: the extension depths of the portions of the tuning screws are adjusted, which protrude from the second holes, into the holes in the bottoms of the resonators, so as to adjust the frequency of an electromagnetic field.

According to the other aspect of the present disclosure, a electronic device is provided, including an antenna.

BRIEF DESCRIPTION OF THE DRAWINGS

The drawings constituting a part of the present disclosure are used for providing a further understanding of the present disclosure. Exemplary embodiments of the present disclosure and descriptions thereof are used for explaining the present disclosure, but do not constitute improper limitations of the present disclosure. In the drawings.

The above drawings include the following reference signs:

10. main body structure; 11. first surface; 12. support member; 13. protruding structure; 130, first hole; 14. filter cavity; 140. groove; 15. filtering structure; 150. cover plate; 1500. second hole; 151. resonator; 152. tuning screw; 20. radiation layer; 30. power distribution layer; 40. guide sheet; 50. reflective metal plate.

DETAILED DESCRIPTION OF THE EMBODIMENTS

It should be pointed out that, the following detailed descriptions are exemplary and are intended to provide further explanation of the present disclosure. Unless otherwise defined, all technical and scientific terms used herein have the same meanings as commonly understood by those of ordinary skill in the art to which the present disclosure belongs.

It should be noted that, terms used herein are for the purpose of describing specific embodiments, but are not intended to limit the exemplary embodiments according to the present disclosure. As used herein, unless the context clearly dictates otherwise, a singular form is intended to include a plural form as well. In addition, it should also be understood that, in a case of the terms "contain" and/or "include" are used in the present specification, they indicate the presence of features, steps, operations, devices, components and/or combinations thereof.

It should be understood that, in a case of an element (such as a layer, a film, a region, or a substrate) is referred to as being "on" another element, it may be directly on the other element, or, there may also be an intermediate element. Furthermore, in the specification and claims, in a case of an element is described as being "connected" to another element, the element may be "directly connected" to the other element or "connected" to the other element by means of a third element.

As described in the background art, in the related art, the cost of manufacturing an antenna is relatively high, and the overall antenna structure is complex. In order to solve the problems of relatively high cost of manufacturing the antenna and the complex overall antenna structure in the related art, embodiments of the present disclosure provide an antenna.

Figure 1:
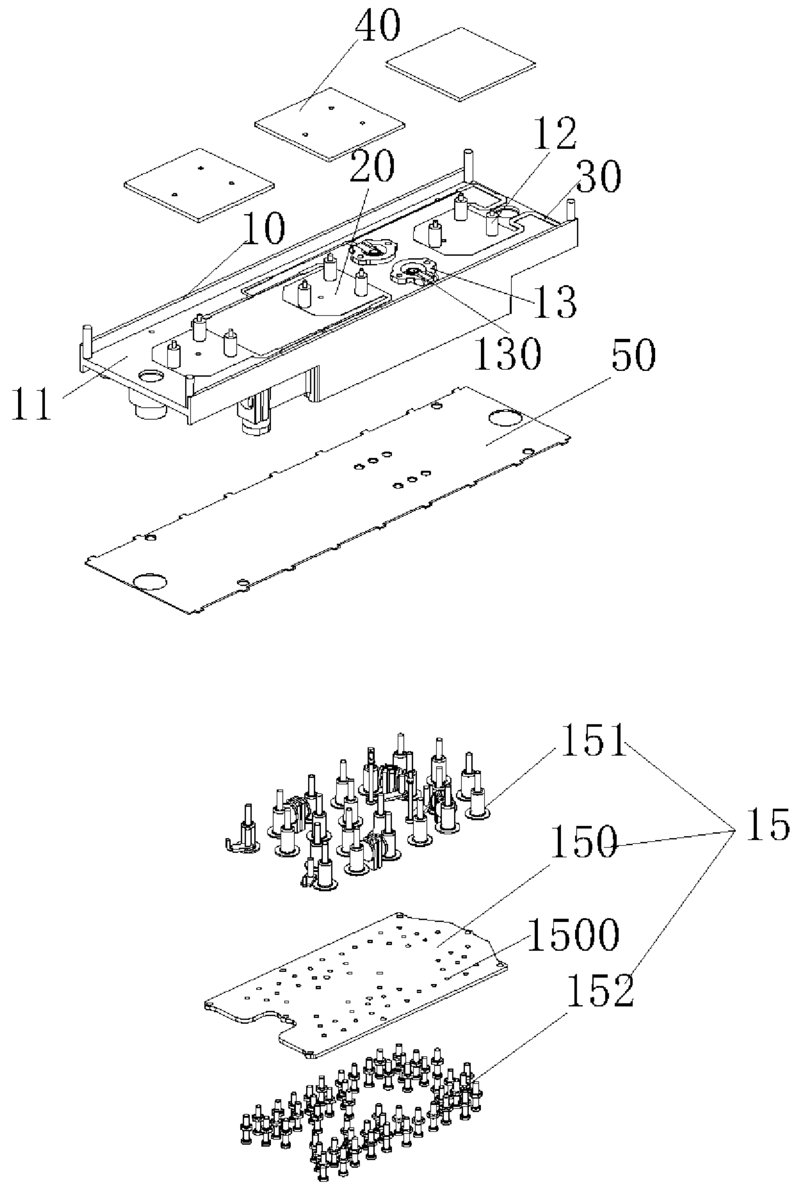
FIG. 1 shows a schematic diagram of an overall structure of an antenna according to an embodiment of the present disclosure.
Figure 3:
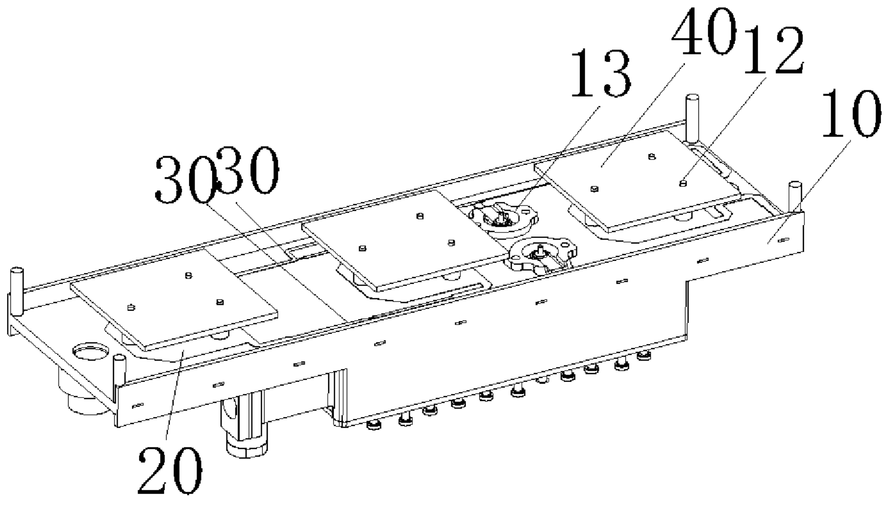
FIG. 3 shows a schematic diagram of an assembled antenna according to an embodiment of the present disclosure.

A typical embodiment of the present disclosure provides an antenna, as shown in FIG. 1 and FIG. 3, including:

a main body structure 10 having a first surface 11, and the main body structure is formed by placing a reflective metal plate 50 in a mold and performing injection molding, and the main body structure 10 is of an integrally formed structure;

a radiation layer 20, and the radiation layer 20 is electroplated on the first surface 11; and a power distribution layer 30, and the power distribution layer 30 is electroplated on the first surface 11, the power distribution layer 30 is electrically connected to the radiation layer 20, and the power distribution layer 30 feeds the radiation layer 20.

In the above solution, the main body structure is formed by an injection molding machine in an injection molding manner, then the radiation layer and the power distribution layer are electroplated on the first surface of the main body structure, and the power distribution layer feeds the radiation layer to realize antenna radiation. The radiation layer and the power distribution layer can be electroplated without a PCB, thereby saving the cost. Moreover, since the main body structure is of an integrally formed structure, the antenna can be assembled just by electroplating the radiation layer and the power distribution layer on the main body structure, therefore the overall structure is simple, components are reduced, and the process is simple, thereby saving a large amount of time costs. In addition, various portions of the antenna are assembled together without manpower, thereby avoiding errors of manual operations, and reducing the defective rate.

In an embodiment of the present disclosure, as shown in FIG. 1, the main body structure 10 includes a support member 12, the support member 12 is installed on the first surface 11, the antenna further includes a guide sheet 40, the guide sheet 40 is installed on the support member 12, and the guide sheet 40 and the radiation layer 20 are oppositely arranged at intervals. Since the guide sheet 40 and the radiation layer 20 are oppositely arranged at intervals, the radiation capability of the antenna is enhanced, and the gain is improved. The support member 12 is provided with a protrusion, a hole is formed in the guide sheet in a penetration manner, and the protrusion passes through the hole in the guide sheet, so as to fix the guide sheet on the support member.

In an embodiment of the present disclosure, as shown in FIG. 1, the distance between the guide sheet 40 and the radiation layer 20 is determined by the material of the guide sheet 40, the size of the guide sheet 40, the material of the radiation layer 20 and the size of the radiation layer 20. The material of the guide sheet 40 and the radiation layer 20 is a metal, the sizes and specific materials of the guide sheet 40 and the radiation layer 20 may be set according to actual needs, and after the sizes and specific materials of the guide sheet 40 and the radiation layer 20 are determined, the distance between the guide sheet 40 and the radiation layer 20 is determined, so as to achieve a better radiation effect, so that the gain meets requirements. During manufacture, after the radiation layer 20 and the power distribution layer 30 are electroplated on the first surface 11, the guide sheet 40 is fixed on the support member 12. That is, the guide sheet 40 is a separately manufactured structure.

In some more specific embodiments, the material of the guide sheet is copper, aluminum, steel, gold and silver, the material of the radiation layer is nickel, tin, gold and silver, the size of the guide sheet is 30.1 mm*28.4 mm, the size of the radiation layer is 21.5 mm*21 mm, and the distance between the guide sheet and the radiation layer is set to be 5.6 mm.

In some embodiments, the area of the guide sheet is greater than that of the radiation layer. By means of such a setting, radiation can be enhanced.

In some embodiments, the guide sheet is in the shape of a rectangle. By means of such a setting, radiation can be enhanced.

In some embodiments, a plurality of guide sheets are provided, and the plurality of the guide sheets are arranged at intervals at the same height. The radiation can be enhanced by arranging the plurality of guide sheets at intervals at the same height.

Figure 4:
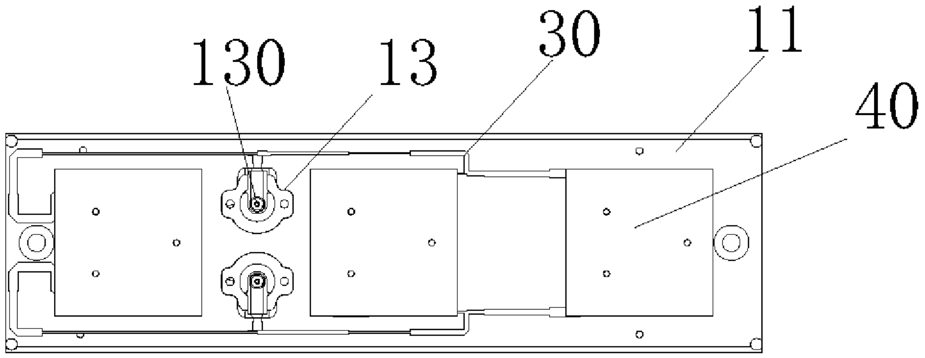
FIG. 4 shows a top view of the assembled antenna according to an embodiment of the present disclosure.
Figure 5:
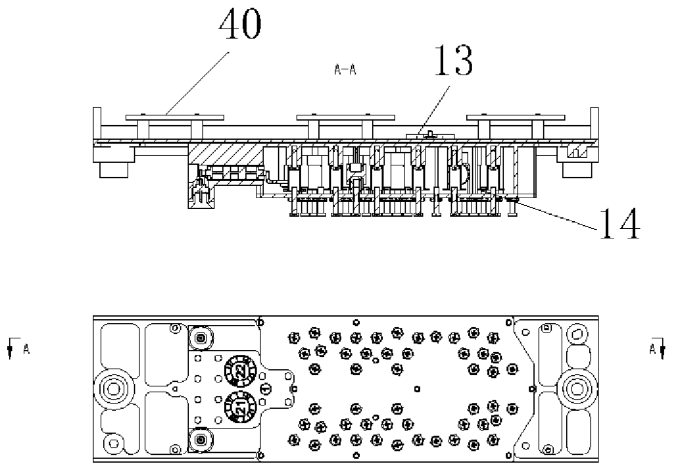
FIG. 5 shows a cross-sectional view of the assembled antenna according to an embodiment of the present disclosure.

In an embodiment of the present disclosure, as shown in FIG. 1, FIG. 4 and FIG. 5, the main body structure 10 includes a protruding structure 13, a first hole 130 is formed in the center of the protruding structure 13 in a penetration mode, a metal column is buried in the first hole 130, an electrical signal is input from the metal column, a first end of the power distribution layer 30 is electrically connected to the metal column, and a second end of the power distribution layer 30 is electrically connected to the radiation layer 20. That is, the electrical signal input from the metal column is then transmitted to the power distribution layer 30, and the power distribution layer 30 feeds the radiation layer 20.

In an embodiment of the present disclosure, as shown in FIG. 1, and FIG. 3 to FIG. 5, two protruding structures 13 are provided, which are respectively a first protruding structure and a second protruding structure, two metal columns are provided, which are respectively a first metal column and a second metal column, the power distribution layer 30 includes a first power distribution line and a second power distribution line, the first end of the first power distribution line is electrically connected to the first metal column, the second end of the first power distribution line is electrically connected to the power distribution layer 30, so as to realize a positive 45-degree radiation feed structure, the first end of the second power distribution line is electrically connected to the second metal column, and the second end of the second power distribution line is electrically connected to the power distribution layer 30, so as to realize a negative 45-degree radiation feed structure. By means of setting the direction of the first power distribution line, the direction of the second power distribution line and corresponding designs of a radiation sheet, the positive 45-degree polarization and negative 45-degree polarization of the antenna can be realized.

In an embodiment of the present disclosure, as shown in FIG. 1 and FIG. 3, the radiation layer 20 is in the shape of a square with two chamfers, the two chamfers are adjacent to each other, the second end of the first power distribution line is electrically connected to a first right angle of the square, so as to realize positive 45-degree radiation, and the second end of the second power distribution line is electrically connected to a second right angle of the square, so as to realize negative 45-degree radiation. By setting the shape of the radiation layer 20 to be the square with two chamfers, radiation requirements can be well met.

Figure 2:
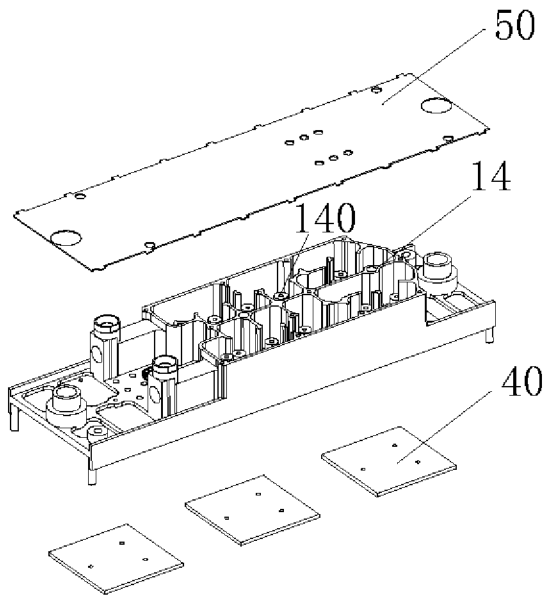
FIG. 2 shows a schematic diagram of a partial structure of the antenna according to an embodiment of the present disclosure.

In an embodiment of the present disclosure, as shown in FIG. 1 and FIG. 2, the antenna further includes a reflective metal plate 50, and the reflective metal plate 50 is embedded in the main body structure 10. The reflective metal plate 50 functions to reflect electromagnetic waves, so that the electromagnetic waves are radiated in one direction.

In an embodiment of the present disclosure, as shown in FIG. 1 and FIG. 2, the main body structure 10 includes a filter cavity 14, and the filter cavity 14 is located on the side of the reflective metal plate 50 that is away from the first surface 11.

In an embodiment of the present disclosure, as shown in FIG. 1 and FIG. 2, the antenna further includes a filtering structure 15, the material of the filtering structure 15 is a metal or a medium with a metal-plated surface, and the filtering structure 15 is located on the filter cavity 14. The filter cavity 14 and the filtering structure 15 work together to filter the electrical signal. An inner wall of the filter cavity 14 is plated with a metal.

In an embodiment of the present disclosure, as shown in FIG. 1 and FIG. 2, a plurality of grooves 140 are formed in the filter cavity 14, the filtering structure 15 includes a cover plate 150, a plurality of resonators 151 and a plurality of tuning screws 152, a plurality of second holes 1500 are formed in the cover plate 150, and the filtering structure 15 is installed on the filter cavity 14 by means of the resonators 151. The second hole 1500 is a threaded hole, the tuning screw 152 passes through the threaded hole, a hole is formed in the bottom of the resonator 151, and the frequency of an electromagnetic field is adjusted by adjusting the depth of the tuning screw 152 in the hole in the bottom of the resonator 151. A protrusion portion of the resonator 151 is embedded in the groove of the filter cavity. That is, to manufacture the antenna in the present disclosure, only the guide sheet, the reflective metal plate and the filter structure need to be manufactured separately, and the rest components are integrally formed, such that the structure is simple, and the assembly process is simple.

Figure 6:
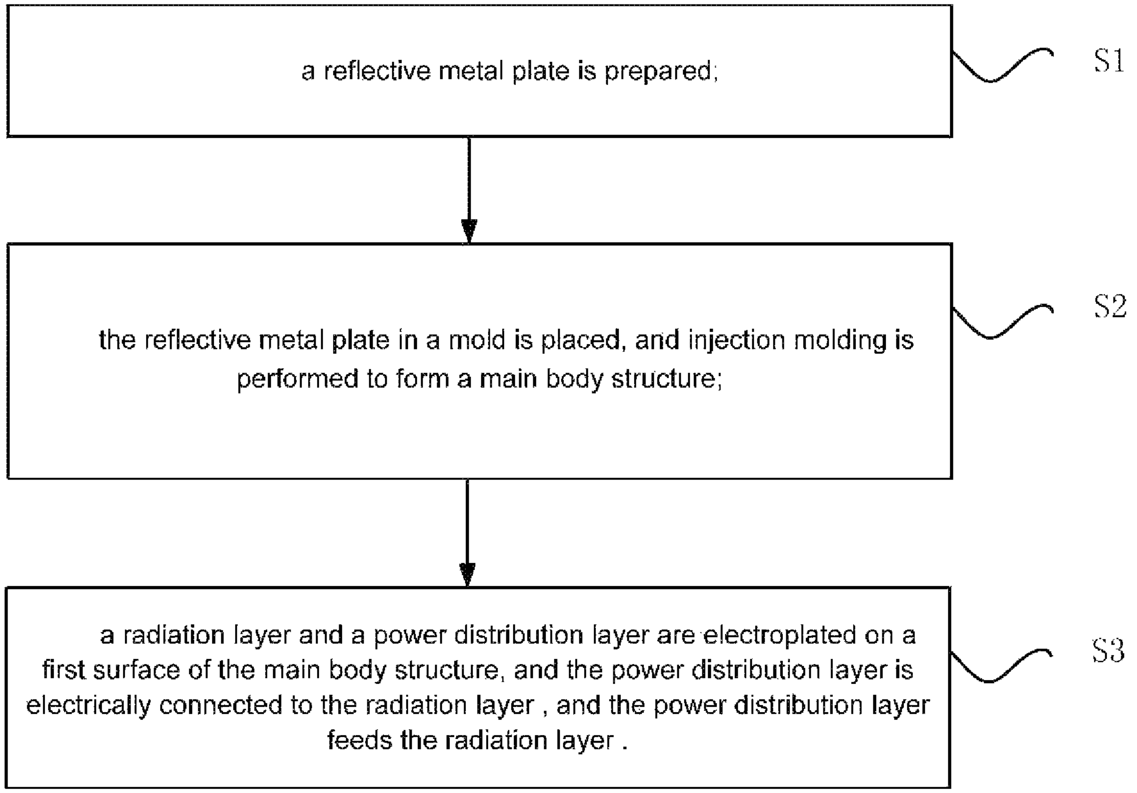
FIG. 6 shows a flow diagram of a manufacturing method of the antenna according to an embodiment of the present disclosure.

Some embodiments of the present application further relate to a manufacturing method of an antenna, as shown in FIG. 6, including the following steps:

Step S1: a reflective metal plate is prepared;

step S2: the reflective metal plate in a mold is placed, and injection molding is performed to form a main body structure; and step S3: a radiation layer and a power distribution layer are electroplated on a first surface of the main body structure, and the power distribution layer is electrically connected to the radiation layer, and the power distribution layer feeds the radiation layer.

In the manufacturing method of the antenna, a reflective metal plate is prepared at first, then the reflective metal plate is placed in the mold, injection molding is performed to form the main body structure, afterwards, the radiation layer and the power distribution layer are electroplated on the first surface of the main body structure, the power distribution layer is electrically connected to the radiation layer, and the power distribution layer feeds the radiation layer. The main body structure is formed by an injection molding machine in an injection molding manner, then the radiation layer and the power distribution layer are electroplated on the first surface of the main body structure, and the power distribution layer feeds the radiation layer to realize antenna radiation. The radiation layer and the power distribution layer can be electroplated without a PCB, thereby saving the cost. Moreover, since the main body structure is of an integrally formed structure, the antenna can be assembled just by electroplating the radiation layer and the power distribution layer on the main body structure, therefore the overall structure is simple, components are reduced, and the process is simple, thereby saving a large amount of time costs. In addition, various portions of the antenna are assembled together without manpower, thereby avoiding errors of manual operations, and reducing the defective rate.

In some embodiments, the method further includes: a filtering structure is made, and the filtering structure comprises a cover plate, a plurality of resonators and a plurality of tuning screws; and a plurality of second holes are formed in the cover plate, and the tuning screws is mounted in the second holes, and portions of the tuning screws, which protrude from the second holes, extend into holes in the bottoms of the resonators.

In some embodiments, the main body structure is provided with a filter cavity, a plurality of grooves (140) are formed in the filter cavity, and the method further includes: embedding protrusion portions of the resonators (151) into the grooves (140) of the filter cavity.

In some embodiments, the method further includes: the extension depths of the portions of the tuning screws are adjusted, which protrude from the second holes, into the holes in the bottoms of the resonators, so as to adjust the frequency of an electromagnetic field.

Some other embodiments of the present application further provide an electronic device, including: the antenna in the above embodiments. For the electronic device including the antenna, since the main body structure of the antenna is of an integrally formed structure, the antenna can be assembled just by electroplating the radiation layer and the power distribution layer on the main body structure, therefore the overall structure is simple, components are reduced, and the process is simple, thereby saving a large amount of time costs, and the cost of the electronic device is thus reduced.

To better explain the present solution, a more specific manufacturing process of the antenna is provided as follows.

Embodiment

The present embodiment relates to a manufacturing process of the antenna, including the following steps:

Step 1: a reflective metal plate is manufactured;

step 2: the reflective metal plate is placed in a mold, and performing injection molding to form a main body structure;

step 3: a radiation layer and a power distribution layer are electroplated on a first surface of the main body structure;

step 4: a filtering structure is manufactured, and the filtering structure is mounted on a filter cavity; and step 5: a manufactured guide sheet is mounted on a support member, so as to form the antenna as shown in FIG. 3.

The antenna in the present embodiment is simple in structure, is easy to assemble, requires no PCB, thus saving the cost, and has better radiation capability.

As can be seen from the above descriptions, the embodiments of the present disclosure achieve the following technical effects:

In the antenna of the present disclosure, the main body structure is formed by an injection molding machine in an injection molding manner, then the radiation layer and the power distribution layer are electroplated on the first surface of the main body structure, and the power distribution layer feeds the radiation layer to realize antenna radiation. The radiation layer and the power distribution layer can be electroplated without a PCB, thereby saving the cost. Moreover, since the main body structure is of an integrally formed structure, the antenna can be assembled just by electroplating the radiation layer and the power distribution layer on the main body structure, therefore the overall structure is simple, components are reduced, and the process is simple, thereby saving a large amount of time costs. In addition, various portions of the antenna are assembled together without manpower, thereby avoiding errors of manual operations, and reducing the defective rate.

The above descriptions are only preferred embodiments of the present disclosure, and are not intended to limit the present disclosure. For those skilled in the art, the present disclosure may have various modifications and changes. Any modifications, equivalent replacements, improvements and the like, made within the spirit and principles of the present disclosure, shall be included within the protection scope of the present disclosure.

What is claimed is:

1. An antenna, comprising:

a main body structure having a first surface, wherein the main body structure is formed by placing a reflective metal plate in a mold and performing injection molding, and the main body structure is an integrated molding structure;

a radiation layer, wherein the radiation layer is electroplated on the first surface; and a power distribution layer, wherein the power distribution layer is electroplated on the first surface, the power distribution layer is electrically connected to the radiation layer, and the power distribution layer feeds the radiation layer;

wherein the main body structure comprises two protruding structures, which are respectively a first protruding structure and a second protruding structure, a first hole is formed in the center of a protruding structure in a penetration mode, a metal column is buried in the first hole, an electrical signal is input from the metal column, two metal columns are provided, which are respectively a first metal column and a second metal column, the power distribution layer comprises a first power distribution line and a second power distribution line, the first end of the first power distribution line is electrically connected to the first metal column, the first end of the second power distribution line is electrically connected to the second metal column;

wherein the radiation layer is in the shape of a square with two chamfers, the two chamfers are adjacent to each other, the second end of the first power distribution line is electrically connected to a first right angle of the square, so as to realize positive 45° radiation, and the second end of the second power distribution line is electrically connected to a second right angle of the square, so as to realize negative 45° radiation.

2. The antenna according to claim 1, wherein the main body structure comprises a support member, the support member is installed on the first surface, the antenna further comprises a guide sheet, the guide sheet is installed on the support member, and the guide sheet and the radiation layer are oppositely arranged at intervals.

3. The antenna according to claim 2, wherein the distance between the guide sheet and the radiation layer is determined by the material of the guide sheet, the size of the guide sheet, the material of the radiation layer and the size of the radiation layer.

4. The antenna according to claim 3, wherein the area of the guide sheet is greater than the area of the radiation layer.

5. The antenna according to claim 3, wherein the guide sheet is in the shape of a rectangle.

6. The antenna according to claim 3, wherein a plurality of guide sheets are provided, and the plurality of guide sheets are arranged at intervals at the same height.

7. The antenna according to claim 1, wherein the main body structure comprises a filter cavity, and the filter cavity is located on the side of the reflective metal plate that is away from the first surface, the antenna further comprises a filtering structure, and the filtering structure is located on the filter cavity.

8. The antenna according to claim 7, wherein a plurality of grooves are formed in the filter cavity, the filtering structure comprises a cover plate, a plurality of resonators and a plurality of tuning screws, a plurality of second holes are formed in the cover plate, and the filtering structure is installed on the filter cavity by means of the resonators.

9. An electronic device, comprising the antenna according to claim 1.

10. The electronic device according to claim 9, wherein the main body structure comprises a support member, the support member is installed on the first surface, the antenna further comprises a guide sheet, the guide sheet is installed on the support member, and the guide sheet and the radiation layer are oppositely arranged at intervals.

11. The electronic device according to claim 10, wherein the distance between the guide sheet and the radiation layer is determined by the material of the guide sheet, the size of the guide sheet, the material of the radiation layer and the size of the radiation layer.

12. The electronic device according to claim 11, wherein the area of the guide sheet is greater than the area of the radiation layer.

13. The antenna according to claim 1, wherein the main body structure comprises a filter cavity, and the filter cavity is located on the side of the reflective metal plate that is away from the first surface.

* * * * *